S. G. GILLESPIE.
SHIELD FOR AIR TUBES OF PNEUMATIC TIRES.
APPLICATION FILED APR. 3, 1915. RENEWED MAR. 7, 1918.
1,278,139.
Patented Sept. 10, 1918.
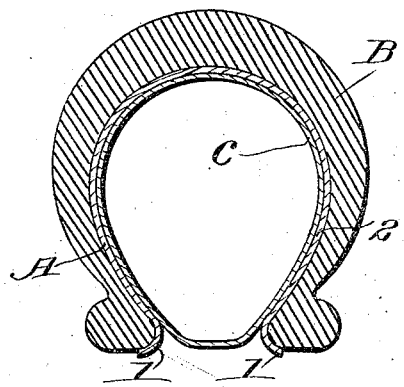
Fig. 1.
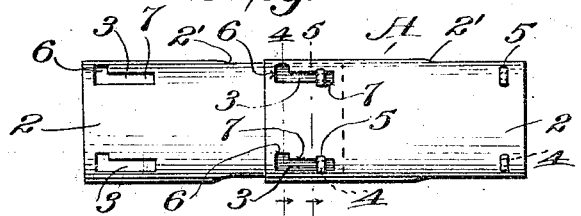
Fig. 2.
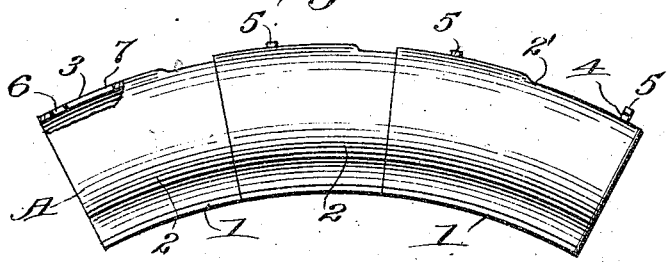
Fig. 3.
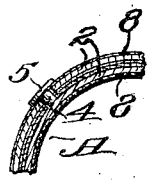
Fig. 6.
Fig. 4. Fig. 5.
Witnesses
M. A. Jones
Fredk T. Fuller
Inventor,
S. G. Gillespie,
By Frank Fuller, Attorney.

UNITED STATES PATENT OFFICE.

SAMUEL G. GILLESPIE, OF CHARLESTON, WEST VIRGINIA.

SHIELD FOR AIR-TUBES OF PNEUMATIC TIRES.

1,278,139.

Specification of Letters Patent. Patented Sept. 10, 1918.

Application filed April 3, 1915, Serial No. 18,896. Renewed March 7, 1918. Serial No. 221,094.

*To all whom it may concern:*

Be it known that SAMUEL G. GILLESPIE, a citizen of the United States, residing at Charleston, in the county of Kanawha and State of West Virginia, has invented certain new and useful Improvements in Shields for Air-Tubes of Pneumatic Tires, of which the following is a specification.

My invention relates to armor or protecting means for the inner air-retaining tubes of pneumatic tires and it aims to provide an effective structure of this nature which will not reduce the flexibility of the tires when in use but will prevent puncture of the said inner tubes; a structure having a plurality of detachably connected sections held in coupled relation by the inflated condition of the inner tubes and which sections are detachable from each other while the inner tubes are deflated; a structure which will retain its shape and remain securely fastened under service conditions; a structure of such form as will not strike stationary objects in the road or path of travel, to avoid the chances of accidents resulting from this cause, and a structure of the nature mentioned which may have a covering to prevent injury to the tire under service conditions.

The foregoing objects I accomplish by a protector disposed intermediate the inner tube and outer casing of a pneumatic tire, comprising a plurality of flexible metallic sections detachably connected together by means of headed studs and L-shaped slots.

With the foregoing as well as additional objects such as will hereinafter appear, in view, the invention has been embodied in one preferred form as illustrated in accompanying drawings, wherein—

Figure 1 is a cross sectional view through a tire equipped with the improved protector;

Fig. 2 is a plan view showing a plurality of protector sections coupled together;

Fig. 3 is a side elevation, partly in section, of a plurality of the protector sections;

Fig. 4 is an enlarged cross sectional view on the line 4—4 of Fig. 2, but partly broken away;

Fig. 5 is an enlarged cross sectional view on the line 5—5 of Fig. 2, but partly broken away; and Fig. 6 is a fragmentary cross sectional view through a modified form of protector.

Referring to the drawings, I have shown the protector which may be generally designated A in connection with a tire in Fig. 1, of which B is the outer shoe or protective casing and C is the usual air-retaining inner tube. The improved protector A is disposed intermediate the outer casing and inner tube and conforms substantially to the interior shape of the casing B. At 1 the longitudinal edges of the protector are curved outwardly to avoid a termination which would injure the tire under service conditions.

Protector A is composed of any desired number of separate arcuate or curved sections 2 which are adapted to be detachably coupled, since each section adjacent one end is provided with one or more L-shaped slots 3 and adjacent the opposite ends are provided with studs 4 having heads 5 thereon. Also the sections 2 adjacent the stud ends are preferably reduced as at 2' so that the slot ends may overlap the same and so that the heads 5 may pass through the slots 3 at enlargements 6 thereof and thence into the elongated ways 7. When the studs 4 are in the ways 7, heads 5 will overlap the sections adjacent the slots serving to connect the sections together against danger of transverse displacement. However, the studs 4 are adapted to move longitudinally of the ways 7, to permit yielding movement of the sections. It will be noted that the slots 3 are closed at both ends and that as a result displacement of the sections through longitudinal or circumferential movement is prevented.

The sections 2 are of material impenetrable to tire-puncturing elements and are preferably made of thin metal, for instance metal which is one-eighth of an inch or less in thickness and which is very flexible so as not to interfere with the yielding of the tire under service conditions. Steel is the preferred metal from which the sections are manufactured.

When the sections are coupled and disposed intermediate the inner tube and outer casing of the tire, and the inner tube is inflated, the sections 2 yield with the tire, but cannot yield to such an extent as to permit detachment of the sections. It might be noted that the slot 3 is simply enlarged at 6 so as to permit the studs and heads 5 thereof to pass through the slots before entering the elongated ways 7 thereof.

In Fig. 6, the modified device illustrated, comprises sections identical with those of the other figures with the addition of protective coverings or envelops 8 which completely inclose the sections so that the coverings 8 rather than the metallic sections will engage with the inner tube and outer tube of the tire and thus avoid chances of "pinching" or other injury to the inner tube and outer casing. Preferably, the covering 8 is of suitable fabric material. The studs 4 pass through the envelops to mount them against lateral displacement relatively to the sections but not so as to hamper the yielding movement of the sections and envelops therewith. As will be realized, the cloth is cutaway opp ite the slots 3 so as to have slots conforming in shape thereto to permit movement of the studs in the slots.

As merely the preferred embodiment has been illustrated and described, it is to be understood that changes in the details of construction may be resorted to within the spirit and scope of the appended claim.

I claim:—

In combination with a tire having a pneumatic tube and a protective casing therefor, a protector for the tube disposed intermediate the tube and casing composed of a plurality of overlapping sections, fabric envelops separate from the tube and casing within which the overlapping sections are disposed to prevent injury of the tire through movement of the sections, and studs connecting the sections, said studs also passing through the envelops and serving the secon function of mounting the envelops against lateral displacement relatively to the sections but so as not to hamper the yielding movement of the sections and envelops movable therewith.

In testimony whereof I affix my signature in presence of two witnesses.

SAMUEL G. GILLESPIE.

Witnesses:
B. WEHRER,
C. A. YOUNG.